US006241379B1

(12) United States Patent
Larsen

(10) Patent No.: US 6,241,379 B1
(45) Date of Patent: *Jun. 5, 2001

(54) MICROMIXER HAVING A MIXING CHAMBER FOR MIXING TWO LIQUIDS THROUGH THE USE OF LAMINAR FLOW

(75) Inventor: Ulrik Darling Larsen, Holte (DK)

(73) Assignee: Danfoss A/S, Nordborg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,949

(22) PCT Filed: Feb. 5, 1997

(86) PCT No.: PCT/DK97/00045

§ 371 Date: Jul. 15, 1998

§ 102(e) Date: Jul. 15, 1998

(87) PCT Pub. No.: WO97/28894

PCT Pub. Date: Aug. 14, 1997

(30) Foreign Application Priority Data

Feb. 7, 1996 (DE) .............................................. 196 04 289

(51) Int. Cl.[7] ...................................................... B01F 5/06
(52) U.S. Cl. ....................................... 366/181.5; 366/337
(58) Field of Search ............................ 366/167.1, 173.1, 366/173.2, 174.1, 175.2, 181.5, 336–340; 48/189.4; 138/37, 39

(56) References Cited

U.S. PATENT DOCUMENTS

| 2,645,463 | * | 7/1953 | Stearns | 366/181.5 |
| 2,704,206 | * | 3/1955 | Crook | 366/181.5 |
| 3,219,483 | * | 11/1965 | Goos et al. | 366/337 |
| 3,928,199 | * | 12/1975 | Kirk et al. | 366/181.5 |
| 4,211,277 | * | 7/1980 | Grosz-Roll et al. | 366/337 |
| 4,753,535 | * | 6/1988 | King | 366/337 |
| 4,981,368 | * | 1/1991 | Smith | 366/337 |
| 4,994,242 | * | 2/1991 | Rae et al. | 366/336 |
| 5,456,533 | * | 10/1995 | Streiff et al. | 366/337 |

FOREIGN PATENT DOCUMENTS

95/30476 * 11/1995 (WO) .................................. 366/337

* cited by examiner

Primary Examiner—Charles E. Cooley
(74) Attorney, Agent, or Firm—Lee, Mann, Smith, McWilliams, Sweeney & Ohlson

(57) ABSTRACT

A micromixer having a mixing chamber for mixing two fluids. The mixing chamber has a first inlet arrangement for the supply of a first fluid and a second inlet arrangement for the supply of a second fluid. The mixing chamber includes a wall along which the first fluid flows, and the second inlet arrangement has at least one opening in the wall. A projection is located on the wall adjacent to the opening and extending into the mixing chamber so that the first fluid flows around the projection and builds a boundary layer with the second fluid. Mixing takes place by diffusion through the boundary layer.

27 Claims, 2 Drawing Sheets

MICROMIXER HAVING A MIXING CHAMBER FOR MIXING TWO LIQUIDS THROUGH THE USE OF LAMINAR FLOW

BACKGROUND OF THE INVENTION

The invention relates to a micromixer having a mixing chamber that is connected to a first inlet channel arrangement, into the wall of which mixing chamber a second inlet channel arrangement opens by way of at least one opening.

Micromixers of that type are becoming increasingly important in the field of chemical analyses. They have the advantage that only very small amounts of liquids or gases that are to be studied and correspondingly small amounts of reagents are required in order to carry out an adequate analysis. The fluid to be studied and the reagent must be mixed with one another in order to obtain a desired reaction. The desired analysis results can then be determined quantitatively or qualitatively by reference to the reaction product. It is also possible in that manner to mix cells, for example blood cells, or granules with fluids or reagents.

Micromixers can also be used as microreactors. For example, two gases can be mixed that are in themselves non-toxic but that become highly toxic in a mixing process. If that is limited to a small volume, slightly reduced safety measures will suffice in comparison with a larger mixer in which a correspondingly greater volume of toxic gas is produced.

In the case of the small volumes that are supplied to the mixing chamber it is, however, relatively difficult to obtain adequate intermixing of the fluids by turbulence. If the intermixing is limited to processes dominated by diffusion, it is important that the diffusion can be influenced specifically by the appropriate introduction of the different fluids into the mixing chamber.

SUMMARY OF THE INVENTION

The problem underlying the invention is therefore to facilitate rapid and predeterminable mixing of fluids.

That problem is solved in a micromixer of the type mentioned at the outset by the fact that there is arranged on the wall adjacent to the opening at least one projection that extends transversely to the direction of flow, the extent of which is greater than the extent of the opening transverse to the direction of flow.

The flow is disrupted by the projection. The fluid from the first inlet channel arrangement, which may, of course, have a plurality of inlet channels, must flow around the projection. When the fluid from the second inlet channel arrangement is then fed into the mixing chamber in precisely that region, it can spread out perpendicularly to the wall into the depth of the mixing chamber significantly better than without disruption caused by the projection. This can be seen clearly when the projection lies in front of the opening in the direction of flow. The opening then lies as it were in the lee of the projection. A fluid that enters the mixing chamber from the second inlet channel arrangement through the opening in the wall can then, protected by the projection, first spread out a little in the mixing chamber before coming into contact with the fluid that is supplied from the first inlet channel arrangement in the direction of flow. That enables the two fluids to be applied to one another advantageously. Diffusion can then take place along the resulting interface, as a result of which the two fluids, for example, a sample and a reagent, are mixed. Surprisingly, however, results that are still usable are obtained when the projection is arranged behind the opening in the direction of flow.

Preferably the projection is located substantially perpendicularly on the wall. That facilitates manufacture. No undercuts or other shapes that are difficult to manufacture need to be formed. The term "perpendicular" is, of course, intended in this case to mean only that which is technically feasible. In some etching processes it is nearly impossible to produce truly perpendicular walls.

It is also advantageous for the projection to extend as far as a covering wall that is opposite to the wall. That provides very good sheltering of the opening so that the entry of the fluid from the second inlet channel arrangement into the mixing chamber is protected. It also provides specific formation of the interface between the two fluids substantially perpendicular to the wall that has the opening. That gives rise to specific layering of the fluids in the mixing chamber combined with mixing by diffusion that can be controlled correspondingly well.

Advantageously the projection is arranged so that at least a portion of its extent is in a region in front of the opening in the direction of flow. As a result, already in a region in front of the opening, defined flow relationships are obtained for the fluid from the first inlet channel arrangement or for the fluid from the second inlet channel arrangement, depending on whether the projection covers the opening so as to shelter it or not.

It is especially preferred for the projection to be of U-shaped construction having two legs, the opening being arranged in the region of a connection between the two legs. As a result, the fluid can flow through the opening into the mixing chamber and can first spread out between both legs of the U before coming into contact with the fluid from the first inlet channel arrangement. As a result, a layer-like flow of the fluid from the second inlet channel arrangement is obtained, onto which is added or laminated from both sides the fluid from the first inlet channel arrangement. That layered structure is obtained without having to undertake complicated canalization in the third dimension. In general, it is sufficient for the fluids to be channelled in one plane, apart from the fact that the opening, of course, requires a step into a different plane.

It is especially preferred for the length of the legs to be a multiple of the distance between the legs or of the height of the projection. In that case, at the outlet of the U a high-quality laminar flat flow of fluid from the second inlet channel arrangement is obtained, onto which there can be adjoined a similarly laminar flow of the fluid from the first inlet channel arrangement. Excellent layering of the fluids can be obtained as a result; when fluid flows around both sides of the projection, the first fluid, that is to say the fluid from the first channel arrangement, is added to the second fluid, that is to say the fluid from the second channel arrangement, from both sides. Thus, two interfaces and, accordingly, double the diffusion surface are obtained. In addition, the diffusion lengths are shortened because the individual molecules must cover only half the distance in order to penetrate the other fluid, with the result that very rapid mixing of the two fluids can be obtained even when the mixing process is based solely or mainly on diffusion.

Preferably the legs are of flat, especially planar, construction and run parallel with one another. As a result, already shortly after being fed through the opening into the mixing chamber, a flow layer having a laminar structure is produced, onto which layers of the other fluid can be laminated from both sides once it has left the intermediate area between the two legs of the U. The formation of such a layer is also improved when the width of the opening corresponds approximately to the distance between the legs. The intermediate area between the two legs can then be filled across its width uniformly and almost without turbulence. The legs are preferably planar. They may alternatively be bent if the fluid from the first inlet channel arrangement is channelled in a correspondingly bent flow path.

In an alternative construction the projection may be of V-shaped construction. Such a construction also renders it possible for the fluid from the second inlet channel arrangement that enters the mixing chamber through the opening to be able first to spread out in the mixing chamber before coming into contact with the fluid from the first inlet channel arrangement. In that manner also, the two fluids can be applied to one another excellently.

Advantageously the mixing chamber has an outlet, the width of which is reduced in size in a direction parallel with the wall. In order to obtain as rapid intermixing as possible, it would be desirable to make the individual layers of the fluids as thin as possible. However, in manufacture it is not possible to provide the projection with walls that are infinitely thin and completely perpendicular, especially when <100> silicon is used. Furthermore, liquids may include particles that can cause major problems if they block the opening or the spacing between the two legs. For that reason, when producing the individual layers, greater thicknesses must be accepted. In order to reduce those thicknesses, the entire composite fluid flow may, however, be compressed, for example by making the dimensions of the mixing chamber smaller in the direction of the outlet. The flow velocity is thus increased. At the same time, however, the layer thicknesses decrease so that better and more rapid intermixing is obtained even by diffusion.

Preferably the ratio of the velocities of a flow through the opening and a flow from the first inlet channel arrangement is adjustable. As a result, the layer thicknesses can be influenced. Furthermore, it is possible for the two fluids to have the same velocity when they meet one another. That also improves the layering and thus facilitates the formation of the diffusion surfaces in a manner that promotes diffusion.

Advantageously a plurality of openings is provided in the wall and each opening has its own projection. In that manner it is possible to obtain a plurality of layers. Each opening together with its associated projection produces its own liquid layer in the mixing chamber, which liquid layer is substantially perpendicular relative to the wall in which the opening is arranged. That plurality of layers can be produced using relatively simple means.

Preferably the openings are arranged in rows and are offset in relation to one another transversely to the direction of flow. The arrangement in rows facilitates construction. Offsetting transversely in relation to one another in the direction of flow facilitates the formation of a plurality of layers adjacent to one another without the projections having to be too close to one another.

It is also preferred that the second inlet channel arrangement has a plurality of connections through which different fluids can be delivered, each opening being connected to a single connection. Thus, only one fluid, or rather one fluid of a specific type, is supplied by way of each opening. A plurality of different fluids can thus be mixed with one another simultaneously or quasi-simultaneously in the mixing chamber, which can simplify analysis when a plurality of reagents is necessary.

In a preferred construction flow paths are formed between adjacent projections and between projections and a side wall of the mixing chamber, which flow paths are aligned at a predetermined angle relative to a connection between the first inlet channel arrangement and the outlet. The angle is preferably greater than 0° and less than 90°. By that measure, also, the layer thicknesses of the individual fluids can be reduced. The fluids are first channelled by the flow paths (for the first fluid) and by the projections (for the second fluid), the fluids being parallel with one another. Directly after the two fluids encounter one another, the then combined fluid flow is bent round and thereby becomes thinner. The thickness can be influenced by the choice of angle. The closer the angle approaches the value 90°, the thinner the layers become. The angle must not, however, become too steep because there is then the risk of the flow breaking away as it changes course.

Preferably the projections that are most closely adjacent to the side wall of the mixing chamber are at a smaller distance away from that side wall than from adjacent projections. Thus, thinner fluid thicknesses can be obtained at the edges of the combined fluid flow. The thickness of those thinner flows is, for example, half the thickness of the fluid layers of the same fluid in the interior of the mixing chamber. The diffusion lengths in that fluid are then held constant across the entire mixing chamber. In the layers in the interior of the mixing chamber, diffusion can take place from both sides so that the individual molecules, statistically speaking, must cover only half the distance. That possibility is absent in the layers at the edge. That is why half the thickness is selected there. Even after a short period, a state of equilibrium is reached in which good intermixing has been achieved mainly by diffusion.

Preferably the second inlet channel arrangement is aligned, as far as the opening, substantially parallel with the first inlet channel arrangement. Substantially identical pressure losses for the two fluids conveyed in the two inlet channel arrangements are obtained. That facilitates mixing of the fluids and controlling the mixing operation.

BRIEF DESCRIPTION OF THE DRAWINGS

The invention is described hereinafter with reference to preferred embodiments, in conjunction with the drawings, in which.

DESCRIPTION OF THE PREFERRED EMBODIMENTS

Figure 4:
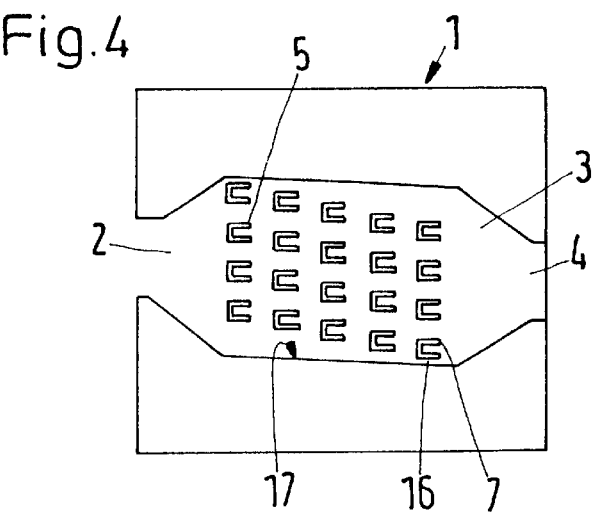
FIG. 4 shows a third construction of a micromixer.

In order to illustrate a few basic elements of a micromixer, reference is first made to FIG. 4. The mixer illustrated therein has a first inlet 2, by way of which a first fluid, for example a liquid, is supplied to a mixing chamber 3. The mixing chamber 3 has an outlet 4, through which the fluid that has been mixed with a second fluid in the mixing chamber 3 can leave the mixing chamber 3. A plurality of individual mixing points 5 is provided in the mixing chamber, each of which mixing points can be used individually as a micromixer. The more detailed construction of such a mixing point 5 is explained schematically in FIG. 1.

Figure 1:
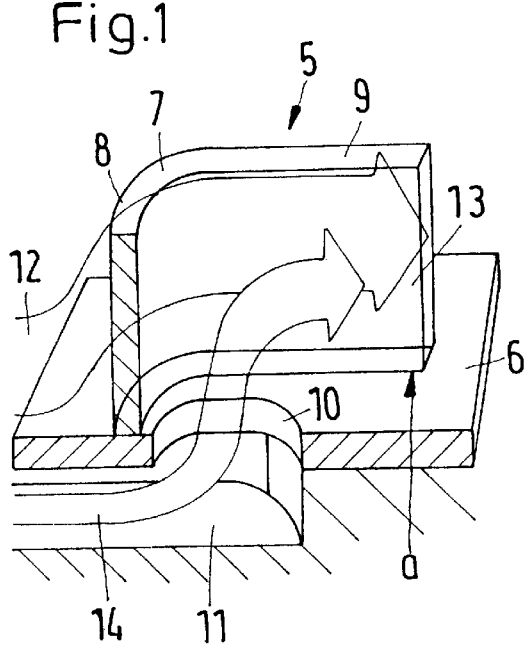
FIG. 1 shows a micromixer in partial section.

FIG. 1 illustrates a wall 6 of the mixing chamber 3. That wall 6 is the wall seen in the illustration of FIG. 4, which is there arranged in the intermediate plane. Arranged approximately perpendicularly to that wall 6 is a projection 7 in the shape of a U. Accordingly, the projection 7 has a base 8 which connects two legs 9 with one another, one of which legs is shown. In the region of the base 8 there is an opening 10 in the wall 6, which opening is connected to a second inlet channel 11 that forms part of a second inlet channel arrangement.

For clarity's sake, the selected illustration is not shown true to scale. In reality, the opening 10 is wider, that is to say it fills the intermediate area between the two legs 9 to a greater extent. The legs 9 are, as a result, longer in relation to the distance a between the two legs. The length of the legs 9 will usually be a multiple of the distance a between the two legs. Since only half of a projection 7 is shown, the distance is, to be more precise, 2a. In all cases the legs 9 run parallel to one another and are constructed in the form of planar walls.

A first arrow 12 symbolizes the first liquid or the first fluid that flows in from the first inlet channel arrangement, in the present case from the inlet 2. The base 8 of the projection 7 is arranged in front of the opening 10 in the direction of flow so that the fluid 12 must flow around the projection 7. Thereafter, however, it is channelled again by the legs 9 of the projection in such a manner that it forms a substantially straight, laminar flow. The same thing occurs on the opposite side, which is not shown, however, for clarity's sake. In the region of the end 13 of the projection 7, the first fluid 12 therefore flows substantially parallel to the extent of the legs 9.

Figure 2:
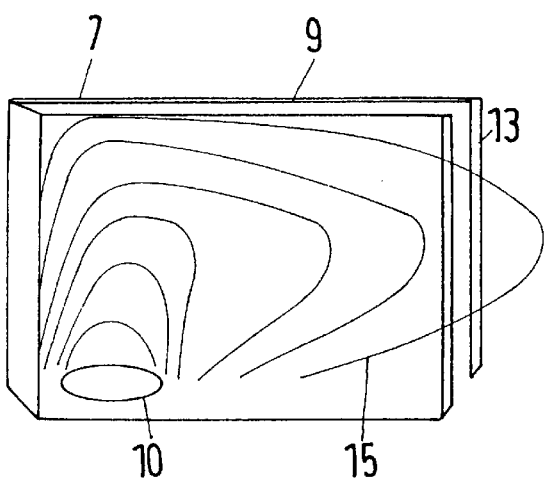
FIG. 2 is a schematic representation of flow lines.

A second fluid that is symbolized by an arrow 14 is fed through the opening 10. Since the opening 10 is, in a manner of speaking, in the lee of the projection 7, or to be more precise, in the lee of the base 8, the second fluid 14 can first spread out inside the U-shaped projection 7 before it likewise begins to flow towards the end 13 of the projection 7. That is shown in FIG. 2, in which flow lines 15 have been drawn in to represent the flow of the second fluid 14. At this point it should be noted that the projection 7 is usually covered, on the side that is opposite to the wall 6, in this case on the upper side, by a covering wall 20 of the mixing chamber 3. The first fluid 12 can thus flow out around the projection 7 in substantially only one plane.

At the end 13 of the projection 7, the first and second fluids 12, 14 have the same direction of flow, that is to say they flow, to a good approximation, parallel with one another. Furthermore, the flow velocities can be so adjusted that both fluids 12, 14 have practically the same velocity at that point. In that construction, the two flows apply themselves to one another smoothly. The second fluid 14 is thus provided on both its longitudinal sides with a layer of the first fluid 12. A relatively large contact surface or boundary layer develops through which diffusion can take place. Accordingly, a large diffusion surface is available so that diffusion processes can take place relatively quickly. The inlet channel 11 runs underneath the wall 6 in a plane that is substantially parallel to the inlet 2 so that the first fluid 12 and the second fluid 14 are channelled to a large extent in parallel until the second fluid 14 reaches the opening 10. Preferably the two fluids can be channelled in the same direction. Alternatively, they can have different directions of flow in their planes. In that manner the pressure losses in the two fluids 12, 14 can be kept substantially the same.

Figure 3:
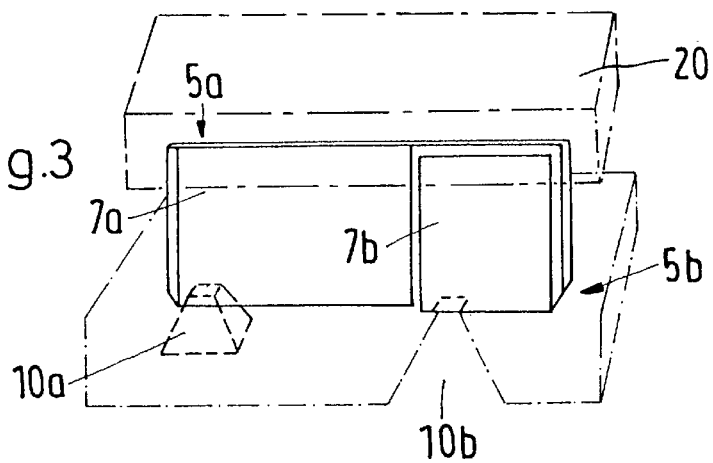
FIG. 3 shows a second construction of a micromixer.

Several such mixing points can be combined with one another, as shown, for example, in FIG. 3. There, two mixing points 5a, 5b are shown schematically, each mixing point 5a, 5b having its own projection 7a, 7b. Each mixing point 5a, 5b is connected to its own supply opening 10a, 10b, it being possible, in a manner not shown, for each opening 10a, 10b to have its own inlet channel so that a different liquid can be mixed in by way of each mixing point 5a, 5b. The mixing principle is, however, unchanged in relation to the illustration according to FIGS. 1 and 2.

Of course, diverse possible variants can be implemented. If there is a spacing between the two projections 7a, 7b transverse to the direction of flow, layering of the liquids F1, F2 and F3 will occur with the sequence F1-F2-F1-F3-F1, the index 1 indicating that the liquid comes from the first inlet channel arrangement, whilst the indices 2 and 3 indicate that the liquids come from different connections. If no spacing is provided between the two projections 7a, 7b, the layering can alternatively be F1-F2-F3-F1. It depends on how one wishes to produce such layering.

The projection 7 can be formed integrally with the wall 6. That can be achieved, for example, by manufacturing the basic body of the mixer 1 from silicon, which body is processed using micro-manufacturing techniques. For example, all unnecessary portions can be etched out so that only the projection 7 remains. The covering of the mixing chamber 3 can then be formed, for example, by a sheet of glass. The channels 11 can be manufactured in an underneath part that is attached adhesively to the wall 6.

In the case of production from <100> silicon, for technical reasons the thickness of the walls of the projection 7 cannot fall below a specific thickness. Also, in many cases, it is not possible to ensure completely perpendicular alignment of the projection 7 relative to the wall 6. Furthermore, liquids may include particles that can cause major problems if the opening 10 or the intermediate area between the legs 9 becomes blocked. Effort is therefore made to make the spacings large enough so that blockages cannot occur and also so that inaccuracies imposed by production have as little effect as possible. The consequence of that is that layer thicknesses can arise during mixing, which, without additional measures, can assume a considerable size. Since, in the case of diffusion, the mixing time increases, roughly speaking, by the square of the layer thicknesses, that can result in relatively long mixing times and correspondingly long mixing zones.

In order to avoid that, the mixing chamber 3 can be widened in the transverse direction as shown in FIG. 4. The individual layers of the liquids or fluids can there be produced with the requisite thickness. When the flow then flows through the reduced outlet 4, those layer thicknesses are compressed. At the same time, the flow velocity is increased. That is, however, not critical. In that manner, relatively thin layer thicknesses of the individual fluids are obtained with the result that the mixing times become relatively short.

On the other hand, that solution has the disadvantage that in that manner the volume of the mixing chamber 3 is increased, which results in a correspondingly greater dead volume.

Thus, in FIG. 4, additionally an option was selected in which various mixing points 5 are arranged in rows substantially transverse to the main direction between the inlet 2 and the outlet 4, the individual mixing points 5 being offset in relation to one another in the transverse direction. They are, as it were, staggered so that as a result of the multiple mixing a relatively large number of layers arises, which layers lie adjacent to one another and are then also relatively thin. It should be noted that the distance between a mixing point 16 that is most closely adjacent to a side wall 17 of the mixing chamber 3 and that side wall 17 itself is smaller than the distance between adjacent projections. In that manner, it is possible to ensure that the outermost layers, that is to say the liquid layers that are adjacent to the wall 17 of the mixing chamber 3, are approximately half as thick as those layers that are in the interior of the mixing chamber 3. In that manner, the diffusion lengths for all the liquid regions in the mixing chamber 3 are substantially the same.

The construction according to FIG. 4 has a number of advantages: the distance between the legs 9 of the projections 7 can be so enlarged that the risk of blockage of the mixer 1 by particles is reduced. By adjusting the distance between the projections and the openings 10 in the projections, the velocity profile of the fluid from the inlet 2 can be adjusted so that all layers that are formed in the mixing chamber 3 attain approximately the same thickness. The layer thickness at the edges may be halved in relation to the remaining layer thicknesses so that the diffusion times there are identical to those in the remaining regions of the mixing chamber 3. The channel 11 that leads to the openings 10 can be led parallel to the entrance channel 2 of the mixer 1 so that the pressure loss for both liquids will be the same. The system is relatively stable even given varying ambient conditions.

Not all mixtures run parallel, however, but slightly offset in both space and time. Also, the individual layer thicknesses attain their ultimate size only when the composite liquid flows through the outlet 4. This can be accepted without difficulty, however, because, with the construction shown, in which there are five rows each having four mixing points 5, twenty mixing operations are obtained so that a correspondingly large number of layers having a correspondingly small thickness is obtained.

Figure 5:
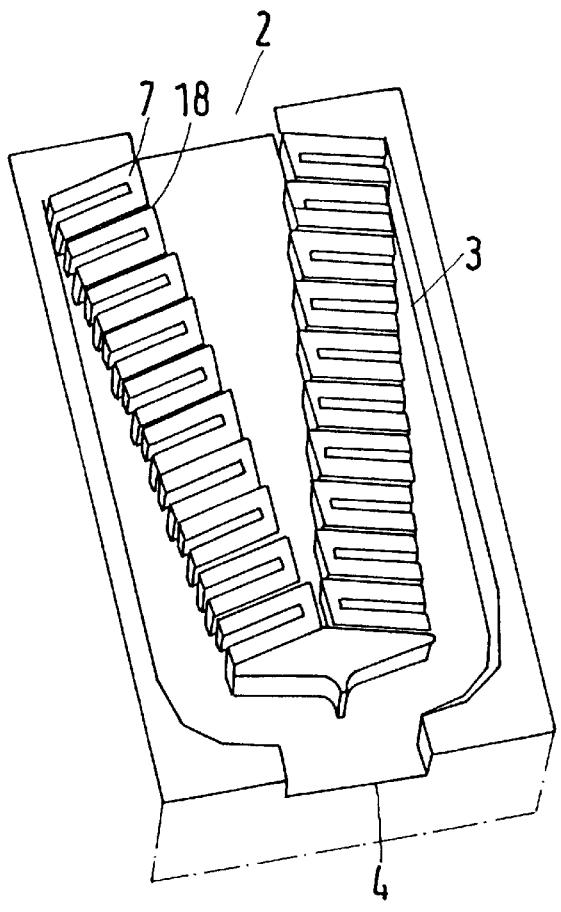
FIG. 5 shows a fourth construction of a micromixer.
Figure 6:
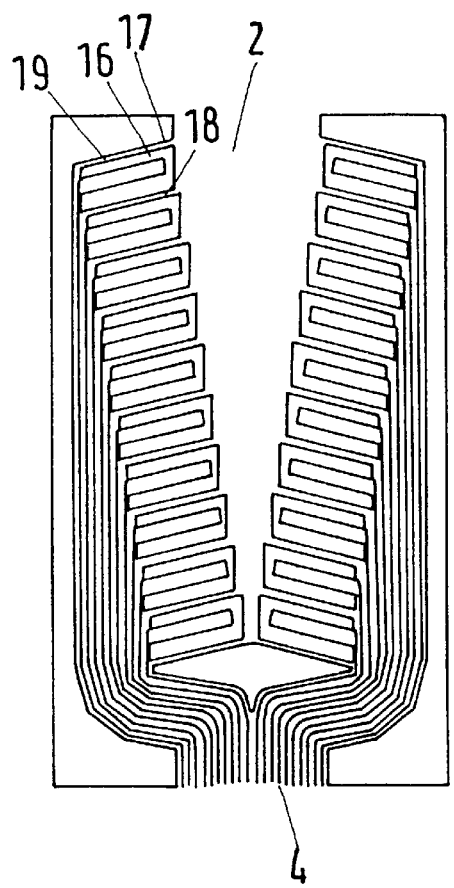
FIG. 6 is a schematic representation of flows in the micromixer according to FIG. 5.
Figure 7:
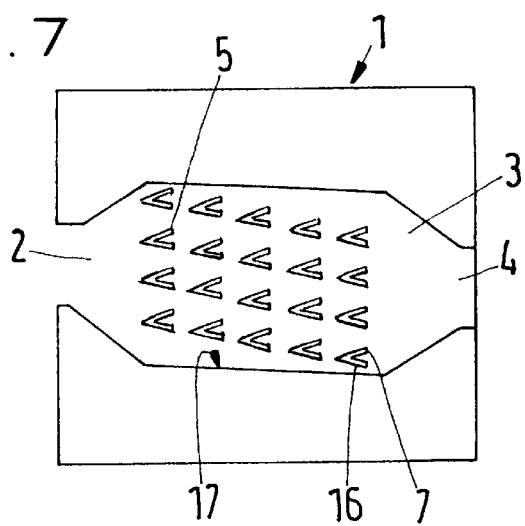
FIG. 7 shows a fifth construction of a micromixer.

An alternative construction is shown in FIG. 5. Here, too, a row of projections 7 is provided in a mixing chamber 3. Those projections 7 are, however, more closely adjacent and form flow paths 18 between themselves that are inclined by a specific angle relative to the main direction between the inlet 2 and the outlet 4, which angle is greater than 0° but less than 90°. The effect can be seen in FIG. 6. As a result of the change in course of the flow both before and after the individual mixing points, relatively thin layers are obtained directly after the two fluids encounter one another so that the mixing by diffusion takes place relatively quickly. It can also be seen that the flow path 19 between the outermost mixing point 16 and the side wall of the housing is only approximately half the width of the flow paths 18 between adjacent mixing elements. The width of the outlet 4 is, here also, slightly less so that the liquid flow is further compressed. That is not, however, essential because a reduction in the thickness of the individual layers can already be obtained by the turning or bending of the liquid flow.

That construction has the advantages that the dead volume of the mixer is small in comparison with other mixers. It is, however, still not negligible. The ultimate layer thickness can be obtained already directly during the combining, which contributes to the reduction in the mixing time or reaction time. Here also, by reducing the layer thickness at the edge, the diffusion times for the edge regions can be kept the same length as for the remainder of the system.

Of course, the supply of the second liquid may take place parallel to the supply of the first liquid in the inlet 2, underneath the base 6. For clarity's sake, however, that is not shown.

Such mixers are referred to also as static mixers because they contain no moving parts. By introducing the projections 7 into the mixing chamber 3, a fluid or liquid can be combined with one or more fluids or liquids. The individual fluids or liquids are applied to one another in thin layers, resulting in a large diffusion surface and a small diffusion length. Diffusion processes can then take place relatively quickly and also be completed quickly.

As a result of optimizing the projections 7, blockage by particle contamination can be avoided to a large extent and a small dead volume is formed. In the construction according to FIGS. 5 and 6, symmetrical mixing is obtained.

The manufacture of the structures is carried out using known technologies, for example by using a two-layer masking film combined with anisotropic plasma etching. If <110> silicon is used instead of <100> silicon, relatively precisely perpendicular walls can be obtained, as a result of which the system is more compact and can be provided with more precise optimization. However, it is sufficient to use <100> silicon plates in which a diaphragm separates a channel on the underside, etched, for example, with KOH, from a plasma-etched channel on the upper side. The opening 10 can then be formed by a hole in the diaphragm. Alternatively, the micromixer can be manufactured differently, for example by plastics moulding or milling of a solid part.

The illustration shows the first liquid or first fluid 12 being supplied by way of an individual inlet 2. Alternatively, instead of that individual inlet 2, an inlet channel arrangement having a greater number of individual channels can be used. The same applies to the second inlet channel arrangement.

It is possible to diverge in many respects from the constructions illustrated without abandoning the essential concept of the invention. Thus, for example, a V-shaped projection can be used instead of the U-shaped projection. Optionally also parallel walls can be joined onto the legs of the V to obtain a U having a V-shaped base.

The opening of the U does not necessarily have to point in the direction of flow. It may also be directed in a direction opposite to the direction of flow if the legs extend beyond the opening in a direction opposite to the direction of flow. By appropriate regulation of the flow of the fluids, it is possible to obtain lamination of the fluids onto one another even in such a construction. The same also applies when a V-shaped projection is used instead of the U-shaped projection. In the latter case, a flank of the projection may even be used to produce a narrowing of the outlet of the mixing chamber.

It is also possible for the course of the mixing chamber to be bent or curved with the result that a correspondingly bent or curved flow path for the first fluid is produced. In that case, it may be advantageous for the projection to have legs of a correspondingly bent shape that channel the second fluid parallel to the first fluid.

Finally, in some cases a projection arrangement suffices that has a single wall in front of the opening in the direction of flow and a wall that is substantially parallel therewith or directed in a different direction therefrom behind the opening. In that case, from the opening the fluid can first spread out in the mixing chamber before coming into contact with the fluid from the first inlet channel arrangement.

Finally, it is not absolutely essential for the projection to extend as far as the cover of the mixing chamber, which cover lies opposite to the wall. In that case, the fluid from the second inlet channel arrangement is covered on three sides by the fluid from the first inlet channel arrangement. If, behind that in the direction of flow, there is arranged another opening without a projection, the fluid from the second inlet channel arrangement can as a result be enclosed or coated with the fluid from the first inlet channel arrangement.

What is claimed is:

1. Micromixer having a mixing chamber for mixing two fluids, the mixing chamber having a first inlet arrangement for the supply of a first fluid and a second inlet arrangement for the supply of a second fluid, the mixing chamber having a wall along which the first fluid flows after having entered from the first inlet arrangement, the second inlet arrangement having at least one opening into said wall, and including a projection extending from said wall adjacent to and partially surrounding the opening, the projection being at least one of a U-shape and a V-shape having two legs, the opening being located in a region of a connection between the two legs, the projection extending into the mixing chamber and having a base such that the first fluid flows around the projection and the second fluid flows from an exit from the projection with the second fluid parallel to the first fluid along a boundary layer between the two fluids, through which layer mixing by diffusion takes place.

2. Micromixer according to claim 1, in which the projection is located substantially perpendicular to the wall.

3. Micromixer according to claims 1, in which the projection is arranged so that at least a portion of its extent is in a region in front of the opening in the direction of flow.

4. Micromixer according to claim 1, in which the legs have a length which is a multiple of distance between the legs or of the height of the projection.

5. Micromixer according to claim 1, in which the legs are of flat construction and run parallel with one another.

6. Micromixer according to claim 1, in which the mixing chamber has an outlet having a width which is smaller than a width of the mixing chamber.

7. Micromixer according to claim 1, in which a ratio of velocities of a flow through the opening and a flow from the first inlet arrangement is adjustable.

8. Micromixer according to claim 1, in which a plurality of openings is provided in the wall and each opening has an associated one projection.

9. Micromixer according to claim 8, in which the openings are arranged in rows and are offset in relation to one another transversely to the direction of flow.

10. Micromixer according to claim 8, in which the second inlet arrangement includes a plurality of connections through which different fluids can be delivered, each opening being connected to a single connection.

11. Micromixer according to claim 8, in which between adjacent projections and between said projections and a side wall of the mixing chamber flow paths are formed that are aligned at a predetermined angle relative to a connection between the first inlet arrangement and an outlet of the mixing chamber.

12. Micromixer according to claim 8, in which the projections that are most closely adjacent to the side wall of the mixing chamber are spaced at a smaller distance from that side wall than from adjacent projections.

13. Micromixer according to claim 1, in which the second inlet arrangement is aligned, as far as the opening, substantially parallel with the first inlet arrangement.

14. Micromixer having a mixing chamber for mixing small amounts of fluid by diffusion, the mixing chamber having a first inlet arrangement for the supply of a first fluid and a second inlet arrangement for the supply of a second fluid, the mixing chamber also having a wall along which the first fluid flows after having entered from the first inlet arrangement, the second inlet arrangement having at least one opening into said wall, and including a projection extending from said wall adjacent to and partially surrounding the opening, the projection being at least one of a U-shape and a V-shape having two legs, the opening being located in a region of a connection between the two legs, the projection extending into the mixing chamber and having a base around which the first fluid flows for establishing a parallel flow between the first and second fluids and for building up a boundary layer between the two fluids, through which layer mixing by diffusion occurs.

15. Micromixer according to claim 14, in which the projection is located substantially perpendicular to the wall.

16. Micromixer according to claim 14, in which the projection extends as far as a covering wall that is opposite to the wall.

17. Micromixer according to claim 14, in which the projection is arranged so that at least a portion of its extent is in a region in front of the opening in the direction of flow.

18. Micromixer according to claim 14, in which the legs have a length which is a multiple of distance between the legs or of the height of the projection.

19. Micromixer according to claim 14, in which the legs are of flat construction and run parallel with one another.

20. Micromixer according to claim 14, in which the mixing chamber has an outlet having a width which is smaller than a width of the mixing chamber.

21. Micromixer according to claim 14, in which a ratio of velocities of a flow through the opening and a flow from the first inlet arrangement is adjustable.

22. Micromixer according to claim 14, in which a plurality of openings is provided in the wall and each opening has an associated one projection.

23. Micromixer according to claim 22, in which the openings are arranged in rows and are offset in relation one another transversely to the direction of flow.

24. Micromixer according to claim 22, in which the second inlet arrangement includes a plurality of connections through which different fluids can be delivered, each opening being connected to a single connection.

25. Micromixer according to claim 22, in which between adjacent projections and between said projections and a side wall of the mixing chamber flow paths are formed that are aligned at a predetermined angle relative to a connection between the first inlet arrangement and an outlet of the mixing chamber.

26. Micromixer according to claim 22, in which the projections that are most closely adjacent to the side wall of the mixing chamber are spaced at a smaller distance from that side wall than from adjacent projections.

27. Micromixer according to claim 14, in which the second inlet arrangement is aligned, as far as the opening, substantially parallel with the first inlet arrangement.

* * * * *